US012621603B2

(12) United States Patent
Matsushita et al.

(10) Patent No.: US 12,621,603 B2
(45) Date of Patent: May 5, 2026

(54) INFORMATION PROCESSING METHOD AND INFORMATION PROCESSING APPARATUS

(71) Applicant: Yamaha Corporation, Hamamatsu (JP)

(72) Inventors: Junya Matsushita, Hamamatsu (JP); Yuki Suemitsu, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 256 days.

(21) Appl. No.: 18/122,874

(22) Filed: Mar. 17, 2023

(65) Prior Publication Data

US 2023/0300522 A1 Sep. 21, 2023

(30) Foreign Application Priority Data

Mar. 18, 2022 (JP) ................................ 2022-044126

(51) Int. Cl.
*H04R 1/38* (2006.01)
*H04R 1/34* (2006.01)

(52) U.S. Cl.
CPC ............... *H04R 1/38* (2013.01); *H04R 1/345* (2013.01)

(58) Field of Classification Search
CPC ........ H04R 1/1008; H04R 1/083; H04R 1/38; H04R 1/345
See application file for complete search history.

(56) References Cited

U.S. PATENT DOCUMENTS

| | | | | |
|---|---|---|---|---|
| 10,206,055 | B1 * | 2/2019 | Mindlin | H04S 5/005 |
| 2010/0053466 | A1 * | 3/2010 | Naka | H04N 21/42204 348/E5.096 |
| 2016/0134986 | A1 | 5/2016 | Liu et al. | |

FOREIGN PATENT DOCUMENTS

| | | | | |
|---|---|---|---|---|
| JP | 2004-77277 | A | 3/2004 | |
| JP | 2008-035251 | A | 2/2008 | |
| JP | 2010-4204 | A | 1/2010 | |
| JP | 2010-63101 | A | 3/2010 | |
| JP | 2016-531511 | A | 10/2016 | |
| WO | WO-2016048381 | A1 * | 3/2016 | H04S 7/302 |
| WO | WO 2021/241421 | A1 | 12/2021 | |

OTHER PUBLICATIONS

U.S. Appl. No. 17/990,853, filed Nov. 21, 2022.
Japanese-language Office Action issued in Japanese Application No. 2022-044126 dated Dec. 16, 2025, with English translation (10 pages).

* cited by examiner

*Primary Examiner* — Carolyn R Edwards
*Assistant Examiner* — Dylan Maguire Neece
(74) *Attorney, Agent, or Firm* — Crowell & Moring LLP

(57) ABSTRACT

An information processing method obtains first position information that indicates a position of at least one of a ceiling surface, a wall surface, or a floor surface in a predetermined space, obtains second position information that indicates a position of an acoustic device that outputs a sound beam in the predetermined space, and obtains direction information that indicates a direction of the sound beam to be outputted from the acoustic device, calculates a locus of the sound beam to be outputted from the acoustic device, based on the first position information, the second position information, and the direction information that have been obtained, and generates a sound beam image that shows the locus of the sound beam, based on a result of calculation.

20 Claims, 10 Drawing Sheets

INFORMATION PROCESSING METHOD AND INFORMATION PROCESSING APPARATUS

CROSS REFERENCE TO RELATED APPLICATIONS

This Nonprovisional application claims priority under 35 U.S.C. § 119(a) to Japanese Patent Application No. 2022-044126 filed on Mar. 18, 2022, the entire content of which is hereby incorporated by reference.

BACKGROUND

Technical Field

An embodiment of the present disclosure relates to an information processing method and an information processing apparatus.

Background Information

International Publication No. 2021/241421 discloses a sound processing apparatus that obtains an image of an acoustic space. The sound processing apparatus sets a plane and a virtual speaker from the image of the acoustic space. The sound processing apparatus calculates sound pressure distribution from characteristics of the virtual speaker, and generates an image in which the sound pressure distribution is overlapped with the plane.

Japanese Unexamined Patent Application Publication No. 2008-035251 discloses a speaker apparatus and a remote controller. The speaker apparatus measures a position of the remote controller. The speaker apparatus directs a sound beam to the position of the remote controller.

A user cannot visually recognize a direction of the sound beam to be outputted from an acoustic device such as a speaker.

SUMMARY

An embodiment of the present disclosure is directed to provide an information processing method in which a user can visually recognize a direction of a sound beam to be outputted from an acoustic device such as a speaker.

An information processing method according to an embodiment of the present disclosure obtains first position information that indicates a position of at least one of a ceiling surface, a wall surface, or a floor surface in a predetermined space, obtains second position information that indicates a position of an acoustic device that outputs a sound beam in the predetermined space, and obtains direction information that indicates a direction of the sound beam to be outputted from the acoustic device; calculates a locus of the sound beam to be outputted from the acoustic device, based on the first position information, the second position information, and the direction information that have been obtained; and generates a sound beam image that shows the locus of the sound beam, based on a result of calculation.

According to the information processing method according to an embodiment of the present disclosure, a user can visually recognize a direction of a sound beam to be outputted from a speaker.

DETAILED DESCRIPTION

First Embodiment

Figure 1:
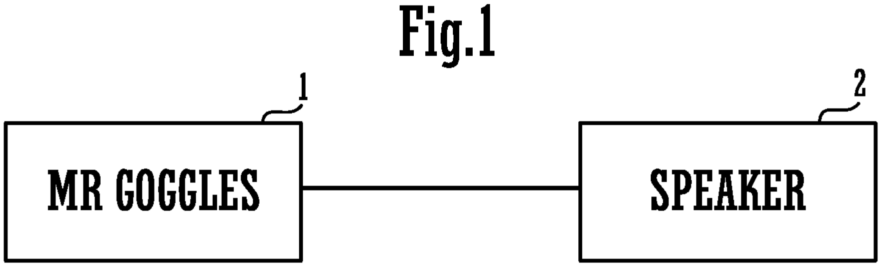
FIG. 1 is a block diagram showing an example of connection between MR goggles 1 and a speaker 2.
Figure 2:
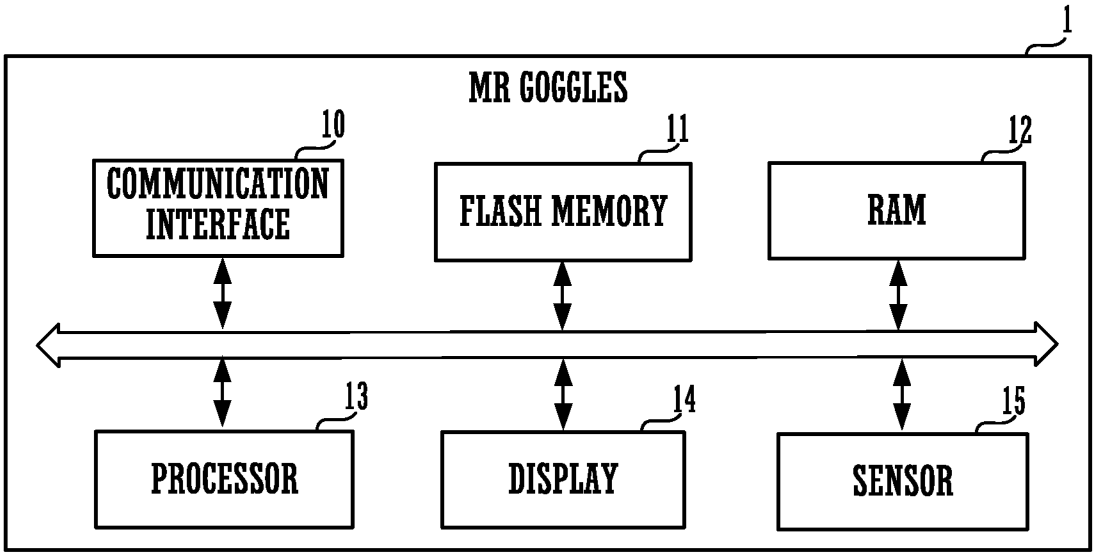
FIG. 2 is a block diagram showing an example of a configuration of the MR goggles 1.
Figure 3:
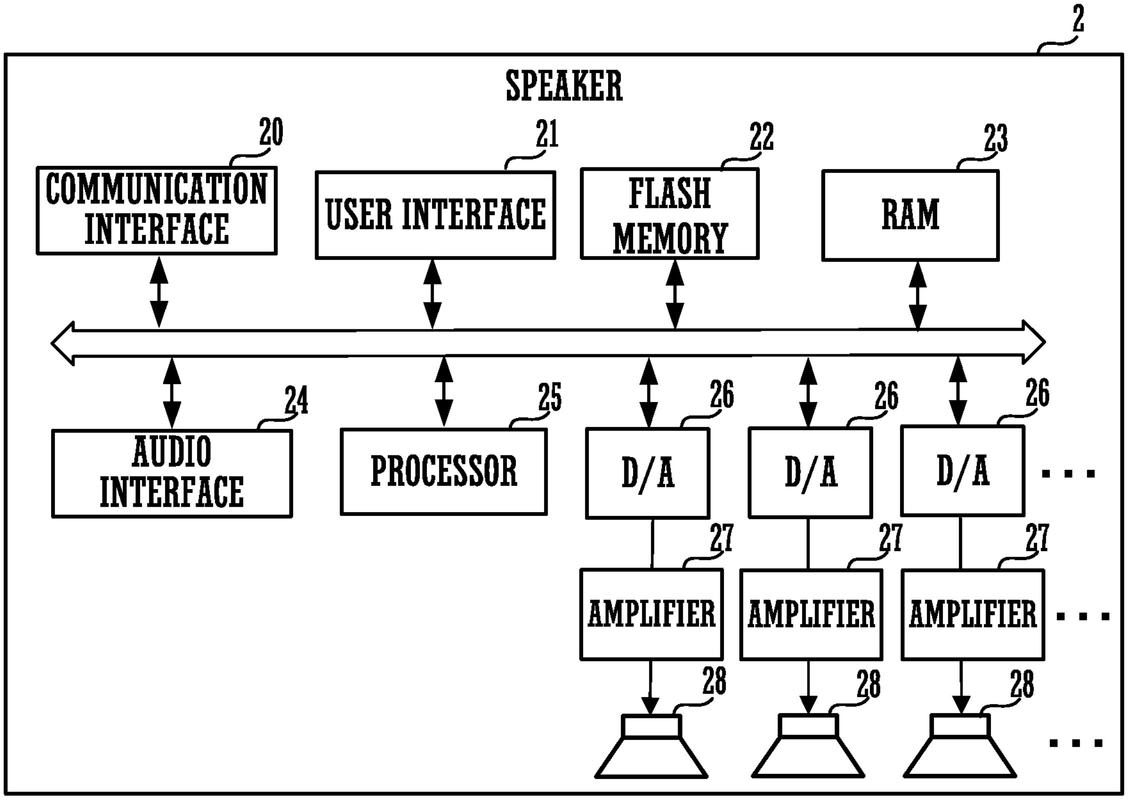
FIG. 3 is a block diagram showing an example of a configuration of the speaker 2.
Figure 4:
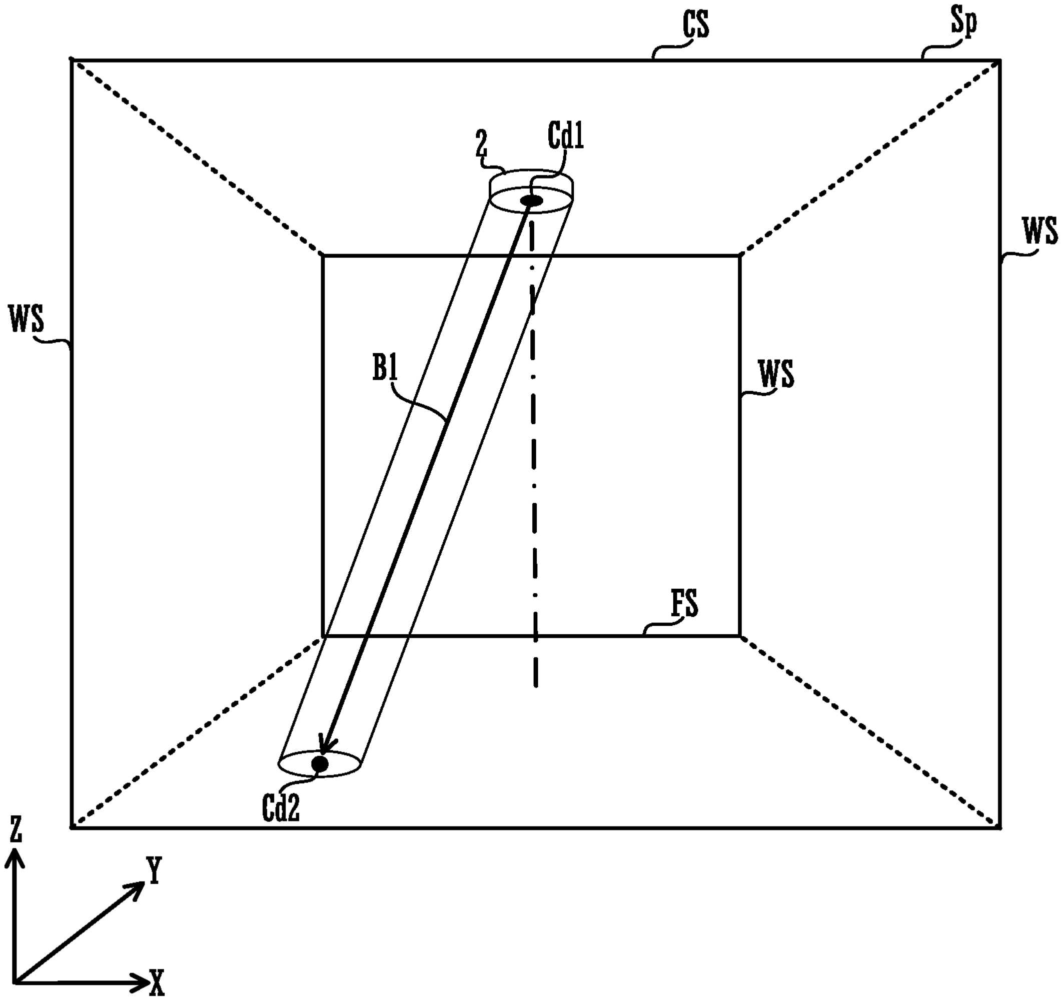
FIG. 4 is a perspective view showing a sound beam B1 outputted in a space Sp.

Hereinafter, MR (Mixed Reality) goggles 1 that execute an information processing method according to a first embodiment will be described with reference to the drawings. FIG. 1 is a block diagram showing an example of connection between the MR goggles 1 and a speaker 2. FIG. 2 is a block diagram showing an example of a configuration of the MR goggles 1. FIG. 3 is a block diagram showing an example of a configuration of the speaker 2. FIG. 4 is a perspective view showing a sound beam B1 outputted in a space Sp.

The MR goggles 1 are an example of an information processing apparatus. A user wearing the MR goggles 1 can visually recognize an image being displayed on the MR goggles 1 while visually recognizing a real space through the MR goggles 1.

As shown in FIG. 1, the MR goggles 1 are connected to the speaker 2 (an example of an acoustic device). Specifically, the MR goggles 1 are connected to the speaker 2 by wireless such as Bluetooth (registered trademark) or Wi-Fi (registered trademark). It is to be noted that the MR goggles 1 do not necessarily need to be connected to the speaker 2 by wireless. The MR goggles 1 may be connected to the speaker 2 by wire. It is to be noted that the MR goggles 1 may be connected to a device (a PC, a smartphone, or the like, for example) other than the speaker 2, in addition to the speaker 2.

As shown in FIG. 2, the MR goggles 1 include a communication interface 10, a flash memory 11, a RAM (Random Access Memory) 12, a processor 13, a display 14, and a sensor 15. The processor 13 may be a CPU (Central Processing Unit), a GPU (Graphical Processing Unit), or the like, for example.

The communication interface 10 may be a network interface or the like. The communication interface 10 communicates with the speaker 2 by wireless such as Wi-Fi (registered trademark) or Bluetooth (registered trademark), for example.

The flash memory 11 stores various programs. The various programs may include a program that operates the MR goggles 1, for example.

The RAM 12 temporarily stores a predetermined program stored in the flash memory 11.

The processor 13 executes various types of processing by reading out the predetermined program stored in the flash memory 11 to the RAM 12. It is to be noted that the processor 13 does not necessarily need to execute the program stored in the flash memory 11. The processor 13, for example, may download a program from a device (a server or the like, for example) outside the MR goggles 1 through the communication interface 10, and may read out a downloaded program to the RAM 12.

The display 14 displays various information based on an operation of the processor 13. In the present embodiment, the display 14 of the MR goggles 1 is an organic EL display including a half mirror and a light emitting element, for example. The user can see a display content (an image or the like) reflected by the half mirror. The half mirror transmits light incident from the front of the user. Therefore, the user can also visually recognize the real space through the half mirror.

The sensor 15 senses an environment around the MR goggles 1 to obtain data. In the present embodiment, the MR goggles 1, as shown in FIG. 4, are worn by a user who is in a closed space Sp including a ceiling surface CS, a wall surface WS, and a floor surface FS. The sensor 15 senses position information that indicates a relative position between the ceiling surface CS and the wall surface WS, and the floor surface FS to obtain data. In the present embodiment, the sensor 15 is a stereo camera, for example. The stereo camera obtains image data DD by capturing a periphery of the MR goggles 1. The stereo camera captures the ceiling surface CS, the wall surface WS, and the floor surface FS. The stereo camera obtains the image data DD obtained by capturing the ceiling surface CS, the wall surface WS, and the floor surface FS.

In addition, as shown in FIG. 4, in the present embodiment, the speaker 2 is placed on the ceiling surface CS configuring the space Sp. The sensor 15 senses position information that indicates a relative position with the speaker 2 to obtain data. Specifically, the stereo camera being an example of the sensor 15 captures the speaker 2 in addition to the ceiling surface CS, the wall surface WS, and the floor surface FS. Therefore, the stereo camera obtains the image data DD obtained by capturing the ceiling surface CS, the wall surface WS, the floor surface FS, and the speaker 2.

It is to be noted that the sensor 15 may not necessarily be a stereo camera. The sensor 15 may be LiDAR (Light Detection And Ranging) or the like, for example. The LiDAR, by obtaining time from irradiation of laser light to detection of the laser light reflected by an object (the speaker 2, the ceiling surface CS, the wall surface WS or the floor surface FS), measures a distance with the object.

The speaker 2 outputs a sound on the basis of an audio signal. The speaker 2 outputs the sound beam B1 with a directivity (see FIG. 4). The speaker 2, as shown in FIG. 3, includes a communication interface 20, a user interface 21, a flash memory 22, a RAM 23, an audio interface 24, a processor 25, a plurality of DA converters 26, a plurality of amplifiers 27, and a plurality of speaker units 28. It is to be noted that, in the example shown in FIG. 3, only three DA converters 26 among the plurality of DA converters 26 are provided with a reference numeral and described. In the example shown in FIG. 3, only three amplifiers 27 among the plurality of amplifiers 27 are provided with a reference numeral and described. In the example shown in FIG. 3, only three speaker units 28 among the plurality of speaker units 28 are provided with a reference numeral and described. The number of DA converters 26, amplifiers 27, and speaker units 28 is not three and may be further larger. The number of DA converters 26, amplifiers 27, and speaker units 28 is not limited.

The communication interface 20 may be a network interface or the like. The communication interface 20 communicates with the MR goggles 1 by wireless such as Wi-Fi (registered trademark) or Bluetooth (registered trademark), for example, or by wire.

The user interface 21 receives various operations from a user. The user interface 21 may be a remote controller, for example. The user sets an angle (an angle seen from the speaker 2) at which the sound beam B1 is outputted, by operating (button operating or the like) the remote controller.

In the present embodiment, the speaker 2 is placed on the ceiling surface CS configuring the space Sp, for example (see FIG. 4). The speaker 2 is placed on the ceiling surface CS so that a front surface on which the plurality of speaker units 28 are arrayed may be parallel to the ceiling surface CS. Therefore, the speaker 2 is placed so that the sound beam B1 may be outputted in a direction of the floor surface FS or the wall surface WS. For example, the MR goggles 1, as shown in FIG. 4, define an X axis, a Y axis, and a Z axis with reference to the position of the MR goggles 1 in the space Sp. In such a case, the speaker 2 is placed so that the sound beam B1 may be outputted with reference to a negative Z direction (a direction perpendicular to the ceiling surface CS and the front of the speaker 2).

Figure 5:
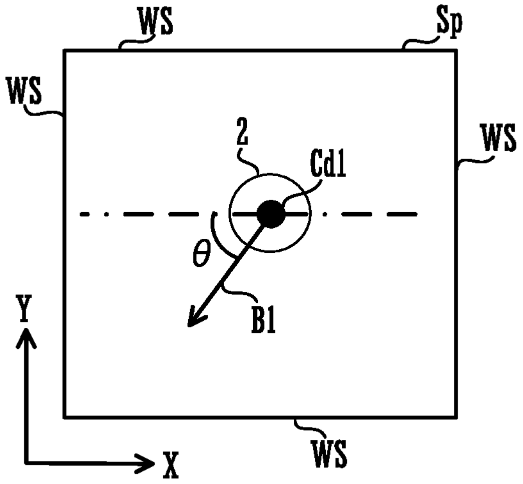
FIG. 5 is a plan view of the space Sp.
Figure 6:
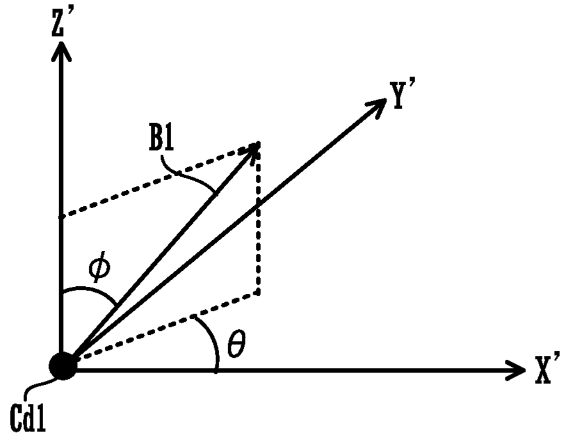
FIG. 6 is a perspective view showing an example of an angle θ and an angle φ of the sound beam B1 in an X' axis, a Y' axis, and a Z' axis with reference to the speaker 2.

FIG. 5 is a plan view of the space Sp. FIG. 6 is a perspective view showing an example of an angle θ and an angle φ of the sound beam B1 in an X' axis, a Y' axis, and a Z' axis with reference to the speaker 2. The X' direction shown in FIG. 6 coincides with a negative X direction shown in FIG. 4 and FIG. 5. The Y' direction shown in FIG. 6 coincides with a negative Y direction shown in FIG. 4 and FIG. 5. The Z' direction shown in FIG. 6 coincides with a negative Z direction shown in FIG. 4 and FIG. 5. A user, as shown in FIG. 5 and FIG. 6, manually sets an angle (an angle of the sound beam B1 to the X' direction) θ in a plane of the speaker 2 and an angle φ to the Z' direction, by using the remote controller (the user interface 21).

The flash memory 22 stores various programs. The various programs may include a program that operates the speaker 2, for example.

The RAM 23 temporarily stores a predetermined program stored in the flash memory 22.

The audio interface 24 receives an audio signal from an apparatus different from the speaker 2 by wireless such as Wi-Fi (registered trademark) or Bluetooth (registered trademark) or by wire. The apparatus different from the speaker 2 may be a not-shown PC, a smartphone, or the like, for example.

The processor 25 executes various types of processing by reading out the predetermined program stored in the flash memory 22 to the RAM 23. The processor 25 may be a CPU or a DSP (Digital Signal Processor), for example. It is to be noted that the processor 25 may include both the CPU and the DSP. It is to be noted that the processor 25 does not necessarily need to execute the program stored in the flash memory 22. The processor 25, for example, may download a program from a device (a server or the like, for example) outside the speaker 2 through the communication interface 20, and may read out a downloaded program to the RAM 23.

The processor 25 receives information (hereinafter referred to as direction information DI) that indicates a direction of the sound beam B1 to be outputted from the speaker 2 according to the operation received by the user interface 21. The direction information DI specifically indicates an angle θ, angle φ, or the like.

The processor 25 performs signal processing on a digital audio signal received through the audio interface 24. The signal processing may include processing to generate the sound beam B1, for example. The processor 25 adjusts a delay amount based on received direction information DI so that a phase of a sound to be outputted from each of the plurality of speaker units 28 may be aligned in a predetermined direction. In such a case, the processor 25 performs delay control based on an adjusted delay amount, to an audio signal to be supplied to each of the plurality of speaker units 28. As a result, a sound to be outputted from each of the plurality of speaker units 28 is mutually strengthened in the predetermined direction. In other words, the processor 25 performs the delay control to the audio signal to be supplied to each of the plurality of speaker units 28 so that a sound may be mutually strengthened in a direction (the angle θ and the angle φ) that has been set by the user.

The plurality of DA converters 26 receive the digital audio signal on which the signal processing has been performed, by the processor 25. The plurality of DA converters 26 obtain an analog audio signal by DA converting a received digital audio signal. The plurality of DA converters 26 send the analog audio signal to the plurality of amplifiers 27.

The plurality of amplifiers 27 amplify the received analog audio signal. Each of the plurality of amplifiers 27 sends an amplified analog audio signal to each of the plurality of speaker units 28.

The plurality of speaker units 28 emit a sound, based on the analog audio signal received from the plurality of amplifiers 27.

It is to be noted that the speaker 2 does not necessarily need to receive a direction in which the sound beam B1 is outputted, based on a user operation to the user interface 21. The speaker 2 may receive information according to the direction in which the sound beam B1 is outputted from a not-shown PC, a smartphone, or the like, through the communication interface 20, for example. In such a case, the PC, the smartphone, or the like installs an application program for setting the direction in which the sound beam B1 is outputted, for example. The application program receives the direction information DI according to an operation from a user. The application program sends the direction information DI to the speaker 2.

Figure 7:
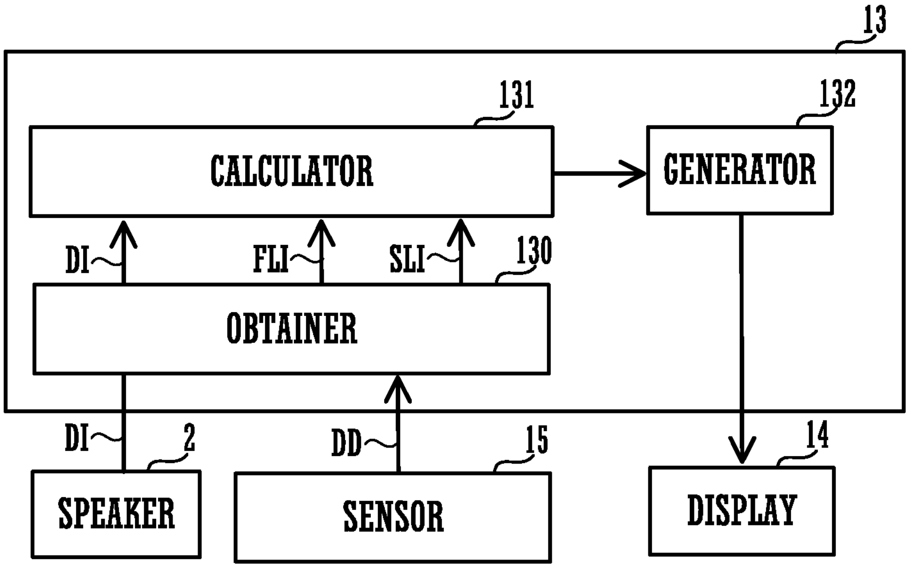
FIG. 7 is a diagram showing a functional configuration of a processor 13.
Figure 8:
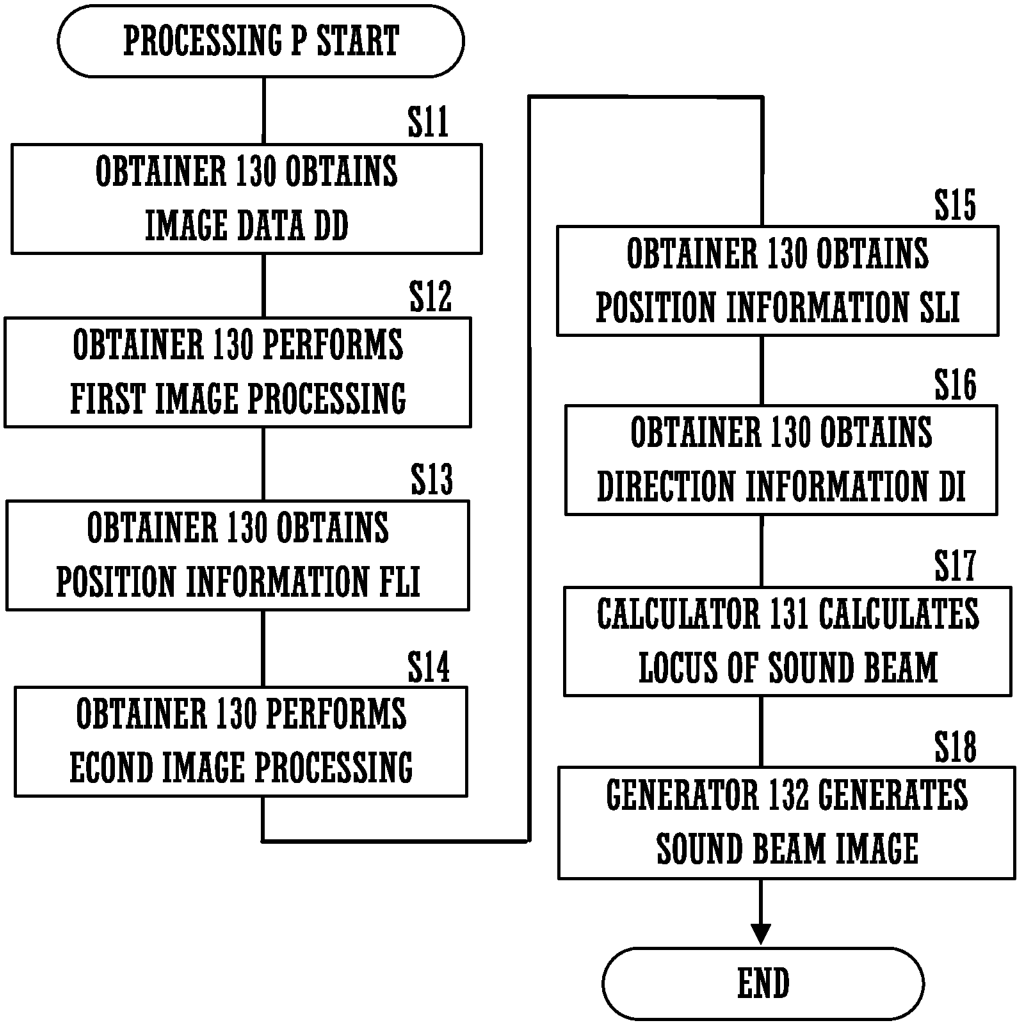
FIG. 8 is a flow chart showing an example of processing of the MR goggles 1.

Hereinafter, processing (hereinafter referred to as processing P) according to visualization of the sound beam B1 in the MR goggles 1 will be described with reference to the drawings. FIG. 7 is a diagram showing a functional configuration of the processor 13. FIG. 8 is a flow chart showing an example of processing of the MR goggles 1.

The processor 13, as shown in FIG. 7, functionally includes an obtainer 130, a calculator 131, and a generator 132. The obtainer 130, the calculator 131, and the generator 132 execute the processing P.

The processor 13 starts the processing P when the MR goggles 1 start up or a predetermined application program according to the processing P is executed, for example (FIG. 8: START).

After a start, the obtainer 130, as shown in FIG. 7, receives the image data DD from the sensor 15 (the stereo camera) (FIG. 8: step S11).

Next, the obtainer 130 performs image processing (first image processing of the present disclosure) to recognize the ceiling surface CS, the wall surface WS, or the floor surface FS from the image data DD (first image data obtained by capturing the ceiling surface CS, the wall surface WS, or the floor surface FS) (FIG. 8: step S12). The first image processing may include, for example, recognition processing by artificial intelligence such as a neural network (DNN (Deep Neural Network) or the like, for example). The obtainer 130 recognizes a boundary between the ceiling surface CS and the wall surface WS, a boundary between the floor surface FS and the wall surface WS, or a boundary between two wall surfaces WS, by the recognition processing by artificial intelligence or the like.

Subsequently, the obtainer 130 obtains position information FLI (first position information in the present disclosure) that indicates a position of the ceiling surface CS, the wall surface WS, or the floor surface FS in a predetermined space (FIG. 8: step S13). In the present embodiment, the obtainer 130 obtains the position information FLI, based on a result of the first image processing. For example, the obtainer 130 recognizes each boundary position of the ceiling surface CS, the wall surface WS, and the floor surface FS, based on each image of the stereo camera (including two cameras). The obtainer 130 obtains three-dimensional coordinates of each boundary position of the ceiling surface CS, the wall surface WS, and the floor surface FS, based on each boundary position of the ceiling surface CS, the wall surface WS, and the floor surface FS and a positional relationship of the two cameras. The obtainer 130 obtains the position information FLI ($a \times x0 + b \times y0 + c \times z0 = d$) that indicates the position of the ceiling surface CS, based on obtained three-dimensional coordinates of the boundary position. The ($a \times x0 + b \times y0 + c \times z0 = d$) is a function that indicates the ceiling surface CS being a plane in a three-dimensional space (an XYZ coordinate space).

The obtainer 130 similarly obtains the position information FLI on each surface (the wall surface WS and the floor surface FS). The MR goggles 1 are able to automatically obtain the position information FLI by the first image processing.

Subsequently, the obtainer 130 performs image processing (second image processing of the present disclosure) to recognizes the speaker 2 (the acoustic device) from the image data DD (second image data obtained by capturing the speaker 2) (FIG. 8: step S14). The second image processing may include pattern matching by use of template data, for example. In such a case, the MR goggles 1 previously store image data that indicates an appearance of the speaker 2, or the like, as template data. The obtainer 130 calculates the degree of similarity between the image data DD and the template data. The obtainer 130, in a case of calculating the degree of similarity exceeding a threshold value, recognizes the speaker 2.

It is to be noted that the MR goggles 1, as with the first image processing, for example, may recognize the speaker 2 by object recognition processing by artificial intelligence. In such a case, the obtainer 130 recognizes the speaker 2 by using a learned model learned by machine learning a relationship between an inputted image and an object such as the speaker 2.

Subsequently, the obtainer 130 obtains position information SLI (second position information) that indicates the position of the speaker 2 that outputs the sound beam B1 in the space Sp (inside the predetermined space) (FIG. 8: step S15). In the present embodiment, the obtainer 130 obtains the position information SLI, based on a result of the second image processing. Specifically, the obtainer 130, in a case of recognizing the speaker 2 in the second image processing, estimates the position of the speaker 2 by the image processing. The obtainer 130 estimates the position of the speaker 2 with respect to the position of the MR goggles 1 as an origin. For example, in FIG. 4, the obtainer 130 obtains coordinates Cd1 (such as coordinates (x1, y1, z1), for example) in the three-dimensional space of the speaker 2 with respect to the coordinates of the MR goggles 1 as the origin. The sensor 15 according to the present embodiment is a stereo camera. Therefore, the obtainer 130 obtains the coordinates Cd1 in the three-dimensional space of the speaker 2, based on the position of the speaker 2 recognized by the image data of each of the stereo camera (the two cameras) and the positional relationship between the two cameras. The front of the speaker 2 in which the plurality of speaker units 28 are arrayed is a plane-shaped mesh. Therefore, the obtainer 130 recognizes a portion of the plane-shaped mesh in the speaker 2, by the image processing. The obtainer 130 calculates a position of the center of gravity of the portion of the mesh, and defines the position of the center of gravity as the coordinates Cd1 in the three-dimensional space of the speaker 2. It is to be noted that the method of calculating the coordinates Cd1 in the three-dimensional space shown above is one example. Therefore, the obtainer 130 does not necessarily need to define the position of the center of gravity of a mesh-shaped portion as the coordinates Cd1 in the three-dimensional space of the speaker 2. In such a manner, the MR goggles 1 are able to automatically obtain the position information SLI by the second image processing.

Subsequently, the obtainer 130 obtains direction information DI that indicates the direction of the sound beam B1 to be outputted from the speaker 2 (FIG. 8: step S16). Specifically, the obtainer 130, as shown in FIG. 7, receives the direction information DI that has been set by the user through the user interface 21, from the speaker 2.

Subsequently, the calculator 131, as shown in FIG. 7, obtains the position information FLI, the position information SLI, and the direction information DI, from the obtainer 130. The calculator 131 calculates a locus of the sound beam B1 to be outputted from the speaker 2, based on the position information FLI, the position information SLI, and the direction information DI that have been obtained (FIG. 8: step S17).

The calculator 131 calculates the direction in which the sound beam B1 in the space Sp is outputted, based on the direction information DI. Specifically, the calculator 131 obtains the angle θ and the angle φ from the speaker 2 as the direction information DI. The angle θ and the angle φ are angles in the polar coordinate system with reference to the position of the speaker 2. Therefore, the calculator 131 obtains a slope (l, m, n) in the three-dimensional rectangular coordinate system corresponding to the angle θ and the angle φ. The calculator 131 defines a straight line (x, y, z)=(x1, y1, z1)+t(l, m, n) (t is any value) passing through the position (x1, y1, z1) of the speaker 2. In addition, the calculator 131 obtains coordinates Cd2 of an intersecting position at which the straight line intersects the floor surface FS or the wall surface WS (see FIG. 4). The calculator 131 defines a line segment from the position of the speaker 2 to the intersecting position as the locus of the sound beam B1. In other words, the calculator 131 defines a line segment from the coordinates Cd1 to the coordinates Cd2 as the locus of the sound beam B1.

Lastly, the generator 132 generates a sound beam image that shows the locus of the sound beam B1, based on a result of calculation of the locus of the sound beam B1 (FIG. 8: step S18). For example, the generator 132 performs calculation to match the above three-dimensional coordinates with a position of the two-dimensional coordinates of the display 14. The generator 132 generates an image that shows the locus of the sound beam B1 corresponding to calculated two-dimensional coordinates. The generator 132 generates an image (such as an image of a cylindrical sound beam B1 as shown in FIG. 4) of a line segment that has a predetermined color and has a predetermined width centered on the locus of the sound beam B1, for example. Accordingly, the generator 132 displays the cylindrical image as a sound beam image on the display 14. In such a case, the user can visually recognize the sound beam image superimposed in the space Sp (the real space) through the display 14. Therefore, the user can visually recognize the sound beam image displayed on the display 14 while visually recognizing the real space.

The above processing from step S11 to step S18 completes execution of a series of processing P in the MR goggles 1 (FIG. 8: END). It is to be noted that the processor 13 may execute step S11 to step S15 after executing step S16.

Advantageous Effect

The MR goggles 1 according to the present embodiment display a generated sound beam image on the display 14. As a result, the user can visually recognize the locus of the sound beam B1 to be outputted from the speaker 2. Therefore, the user can visually recognize the direction of the sound beam B1 to be outputted from the speaker 2. As a result, the user can more easily adjust the sound beam B1. For example, the user can correctly adjust the angle of the sound beam B1, or the like, by seeing a visualized sound beam B1. Therefore, the user, by comparing a case of adjusting the sound beam B1 only by a sound, can orient the direction of the sound beam B1 to a desired direction.

It is to be noted that the speaker 2 does not necessarily need to be placed in the closed space Sp including the ceiling surface CS, the wall surface WS, and the floor surface FS. For example, the speaker 2 may be placed in a space such as an open space that has no ceiling surface CS. In such a case, the speaker 2 is placed on the wall surface WS or the floor surface FS, for example.

It is to be noted that the speaker 2 may be placed outdoors. In such a case, the speaker 2 is placed on the floor surface FS.

First Modification

Figure 9:
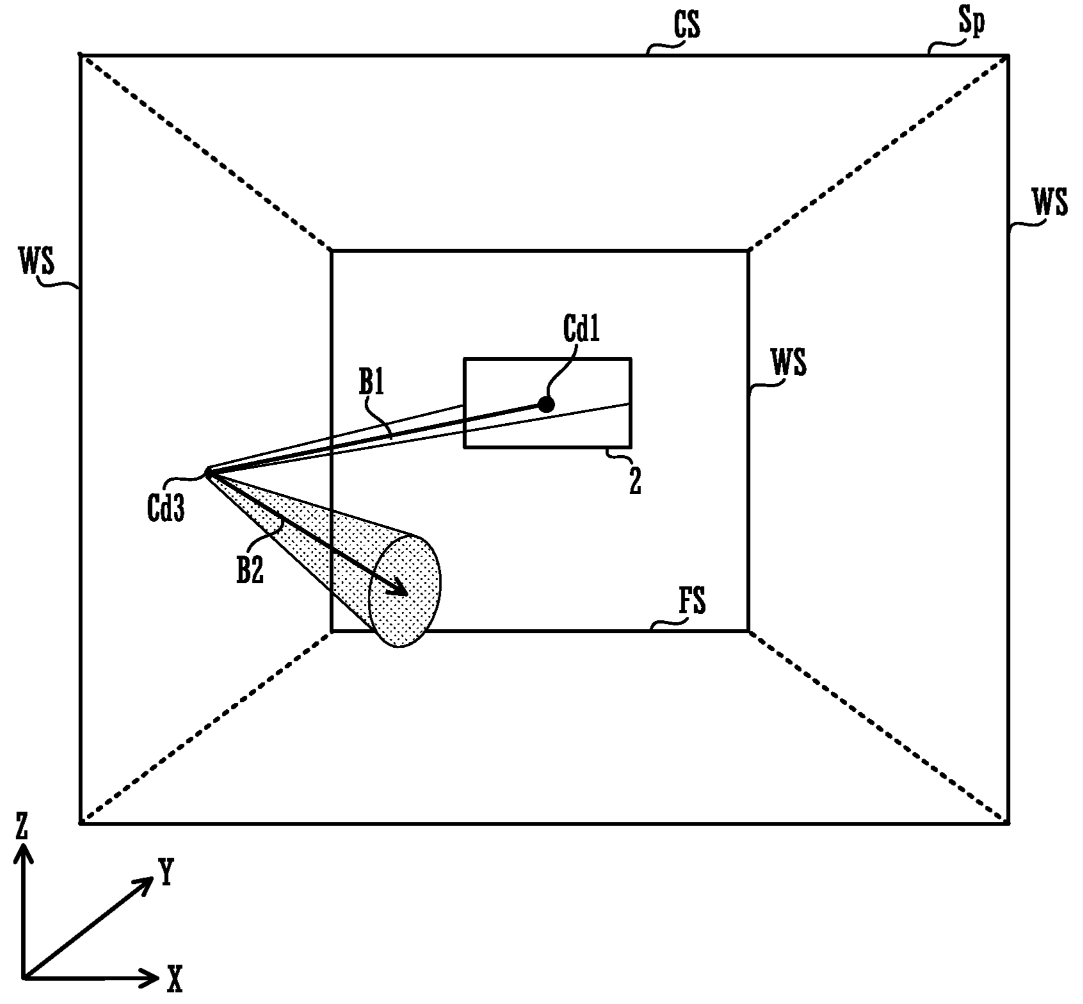
FIG. 9 is a view showing the sound beam B1 and a sound beam B2 that have been outputted in the space Sp.

Hereinafter, MR goggles 1*a* according to a first modification will be described with reference to the drawings. FIG. 9 is a view showing the sound beam B1 and a sound beam B2 that have been outputted in the space Sp. As shown in FIG. 9, the MR goggles 1*a* are different from the MR goggles 1 in that an image that shows a locus of the sound beam B2 reflected on the wall surface WS is displayed. In addition, the speaker 2 of the present modification is different from the above embodiment in that the speaker 2 is placed on the wall surface WS. All other configurations are the same as the configurations in the first embodiment.

The speaker 2 is placed so that the sound beam B1 may be outputted with reference to a negative Y direction (a direction perpendicular to the wall surface WS and the front of the speaker 2). Therefore, in the present modification, the X' direction shown in FIG. 6 coincides with a negative X direction shown in FIG. 9. The Y' direction shown in FIG. 6 coincides with a negative Z direction shown in FIG. 9. The Z' direction shown in FIG. 6 coincides with a negative Y direction shown in FIG. 9. A user sets an angle θ of the sound beam B1 to the X' direction of the speaker 2 and an angle φ to the Z' direction.

The calculator 131 of the MR goggles 1*a* obtains a slope (l1, m1, n1) in the three-dimensional rectangular coordinate system corresponding to the angle θ and the angle φ in the polar coordinate system. In addition, the calculator 131 of the MR goggles 1*a* obtains a position (x2, y2, z2) of the speaker 2 by the above second image processing or the like. The calculator 131 of the MR goggles 1*a* obtains coordinates Cd3 of an intersecting position at which a straight line (x, y, z)=(x2, y2, z2)+t(l1, m1, n1) passing through the position (x2, y2, z2) of the speaker 2 intersects the wall surface WS (see FIG. 9). The calculator 131 defines a line segment from the coordinates Cd1 to the coordinates Cd3 (x3, y3, z3) as the locus of the sound beam B1.

As shown in FIG. 9, the sound beam B1 outputted from the speaker 2 is reflected on the wall surface WS (the coordinates Cd3). Therefore, the calculator 131 calculates the locus of the sound beam B2 reflected by the coordinates Cd3, after calculating the locus of the sound beam B1. In other words, the calculator 131 calculates the position (the coordinates Cd2) of the sound beam B1 reflected on the wall surface WS and the locus of the sound beam B2 after a reflection, based on the position information FLI, the position information SLI, and the direction information DI. In a case in which the sound beam B1 is outputted in the negative X direction, the sound beam B2 is reflected on the wall surface WS and then is reflected back in the X direction. Therefore, a direction vector of the X axis of the straight line that shows the sound beam B2 is reversed to a direction vector of the X axis of the straight line that shows the sound beam B1. In contrast, a direction vector of the Y axis of the straight line that shows the sound beam B2 is the same as a direction vector of the Y axis of the straight line that shows the sound beam B1, and a direction vector of the Z axis of the straight line that shows the sound beam B2 is the same as a direction vector of the Z axis of the straight line that shows the sound beam B1. Therefore, the straight line that shows the sound beam B2 is set to (x, y, z)=(x3, y3, z3)+t(−l1, m1, n1).

Lastly, the generator 132 of the MR goggles 1*a* generates a sound beam image that shows the loci of the sound beam B1 and the sound beam B2. For example, the generator 132 of the MR goggles 1*a*, as with the generator 132 of the MR goggles 1, performs calculation that matches the above three-dimensional coordinates with the position of the two-dimensional coordinates of the display 14. In such a case, the sound beam image includes an image (a reflection image) that shows the locus of the sound beam B2 after the reflection.

It is to be noted that the number of reflections is not limited to one. The sound beam may be outputted toward the ceiling surface CS and may be reflected on the ceiling surface CS. In addition, a sound beam may be outputted toward the floor surface FS and may be reflected on the floor surface FS.

Moreover, the MR goggles 1*a* may vary the color or the like of the image that shows the sound beam before and after a reflection, based on the characteristic information (the degree of sound absorption of the ceiling surface CS, the wall surface WS, or the sound absorption of the floor surface FS, for example) on the ceiling surface CS, the wall surface WS, or the floor surface FS. Specifically, the calculator 131 obtains the characteristic information (the degree of sound absorption of the ceiling surface CS, the wall surface WS, or the floor surface FS, for example) on the ceiling surface CS, the wall surface WS, or the floor surface FS. For example, the calculator 131 previously reads out the characteristic information stored in the flash memory 11. The generator 132 varies the image (the reflection image) that shows the sound beam B2, based on the degree of sound absorption. For example, the generator 132, according to the degree of sound absorption, causes (varies from dark blue to light blue, for example) the color of the image that shows the sound beam B2 after the reflection to be lighter than the color of the image that shows the sound beam B1 before the reflection.

It is to be noted that the characteristic information is not limited to the degree of sound absorption. The characteristic information may include the surface hardness, surface roughness, thickness, density or the like, of a wall or the like, for example. In such a case, the calculator 131 previously reads out (obtains) the characteristic information stored in the flash memory 11, for example. The generator 132 changes the image, based on read characteristic information. For example, the generator 132 varies (varies from dark blue to light blue, for example) the shade of the image that shows the sound beam B1 according to the density of a wall or the like. Similarly, the generator 132 varies the shade of the image that shows the sound beam B1, based on the surface hardness, surface roughness, thickness, or the like, of a wall or the like, for example.

Moreover, the MR goggles 1*a* may estimate a degree of sound absorption, based on obtained surface hardness, surface roughness, thickness, density or the like, of a wall or the like, and may vary the image that shows the sound beam B1, based on an estimated degree of sound absorption.

It is to be noted that the MR goggles 1*a*, even in a case of obtaining no characteristic information, may suitably vary the color or the like of the image that shows the sound beam before and after the reflection.

Moreover, the generator 132 may vary a property other than the color of the image that shows the sound beam. For example, the generator 132 may vary (varies a length of a width of a line segment that shows the sound beam, for example) a size of the image that shows the locus of the sound beam, or may vary a shape or the like, before and after the reflection.

It is to be noted that the MR goggles 1*a* may vary the sound beam image, based on information other than the characteristic information. For example, the generator 132 may vary the sound beam image, based on at least one of a channel of the sound beam, a volume of the sound beam, or frequency characteristics of the sound beam. For example, the generator 132 may generate the sound beam image so that the color or the like of the image of the sound beam to be outputted from an R channel of the speaker 2 may be different from the color of the image of the sound beam to be outputted from an L channel of the speaker 2. In addition, for example, the generator 132 may thicken the color as the volume of the sound beam is increased. Moreover, for example, the generator 132 may vary the color of the image that shows the sound beam according to frequency. For example, the generator 132 may vary the color of the image to red when the level of a low frequency component is high and to blue when the level of a high frequency component is high.

Advantageous Effect

The user cannot visually recognize the sound beams B1 and B2, and finds it extremely difficult to determine in which the direction the sound beam B2 reflected on a wall goes. In contrast, the MR goggles 1*a* visualize the sound beam B2 reflected on the ceiling surface CS, the wall surface WS, or the floor surface FS. As a result, the user can visually recognize the locus of the sound beam B2 reflected on the wall or the like. Therefore, the user can more easily perform adjustment or the like of the direction of the sound beam B2 reflected on the wall or the like.

For example, the MR goggles 1*a* vary the shade of the color of the sound beam image before and after the reflection, according to the degree of sound absorption of the ceiling surface CS, the wall surface WS, or the floor surface FS. As a result, the user can visually recognize the variation or the like of the volume of the sound beam B2 to be reflected on the wall or the like.

For example, the MR goggles 1*a* vary the sound beam image, based on the channel of the sound beam. As a result, the user can visually recognize from which either the R channel or the L channel the sound beam has been outputted, or the like, for example.

For example, the MR goggles 1*a* vary the sound beam image, based on the frequency characteristics of the sound beam. As a result, the user can visually recognize the frequency of the sound beam.

Second Modification

An information processing apparatus of a second modification is VR (Virtual Reality) goggles (not shown), in place of MR goggles. The VR goggles display an image on the basis of image data DD (camera image data) obtained by capturing by the sensor 15 (the stereo camera) on the display 14. As a result, a user of the VR goggles can visually recognize a real space by the image displayed on the display 14.

The VR goggles, as with the processor 13 of the MR goggles 1, calculate the locus of a sound beam B1 and generates a sound beam image.

The VR goggles generate the image (hereinafter, referred to as a display image) displayed on the display 14 from the image data DD (the camera image data), and performs processing to superimpose the sound beam image of the sound beam B1 on the display image. The VR goggles output the display image on which the sound beam image is superimposed, to the display 14. As a result, the user can visually recognize the locus of the sound beam B1, while visually recognizing a real space (a space around the user). In this manner, the VR goggles produce the same effect as the MR goggles 1.

It is to be noted that the information processing apparatus such as a smartphone, similarly to the above, is also able to display the display image on which the sound beam image is superimposed.

Third Modification

Figure 10:
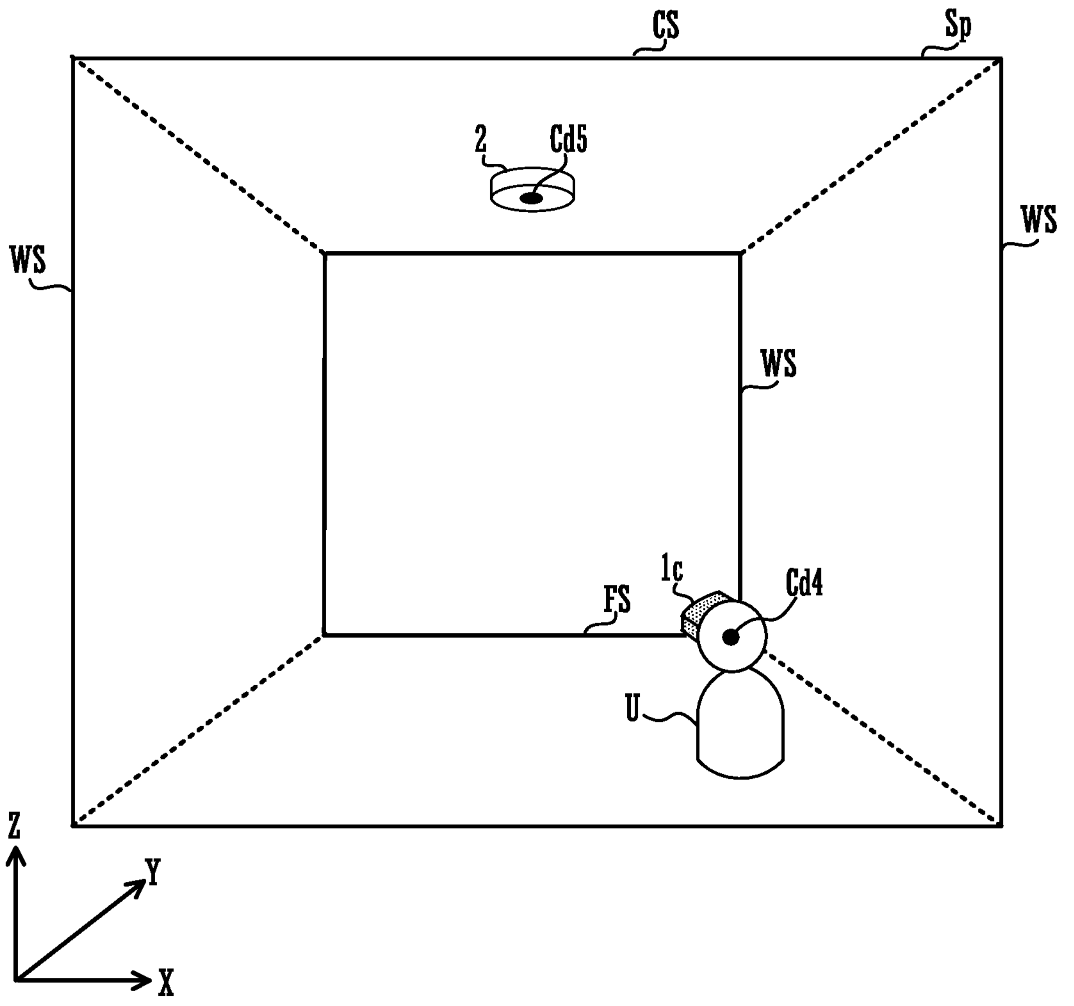
FIG. 10 is a view showing an image of the speaker 2, a ceiling surface CS, a wall surface WS, and a floor surface FS that have been captured by a capturing camera different from the MR goggles 1.

Hereinafter, MR goggles 1 according to a third modification will be described with reference to the drawings. FIG. 10 is a view showing an image of the speaker 2, the ceiling surface CS, the wall surface WS, and the floor surface FS that have been captured by a capturing camera different from the MR goggles 1.

In the present modification, a camera (hereinafter, referred to as a capturing camera) placed at a position different from the position of the MR goggles 1 also detect a position of a user U. In other words, the capturing camera detects position information FLI on the ceiling surface CS, the wall surface WS, and the floor surface FS, position information SLI on the speaker 2 (the acoustic device), and user position information. The MR goggles 1 obtain the position information FLI, the position information SLI, and the user position information, from the capturing camera. The MR goggles 1 obtain direction information DI of a sound beam, from the speaker 2. The MR goggles 1 calculate the locus of the sound beam to be outputted from the speaker 2 (the acoustic device), based on the position information FLI, the position information SLI, the direction information DI, and the user position information that have been obtained.

The capturing camera is placed at a position (a position at which an image as shown in FIG. 10 is able to be captured) at which the user U of the MR goggles 1, the speaker 2, the ceiling surface CS, the wall surface WS, and the floor surface FS are able to be captured. The capturing camera obtains image data DD by capturing the user of the MR goggles 1, the speaker 2, the ceiling surface CS, the wall surface WS, and the floor surface FS.

The capturing camera performs the first image processing and the second image processing on the image data DD. In addition, the capturing camera obtains the user position information that shows the position (coordinates Cd4 shown in FIG. 10) of the user U, from the image data DD. Specifically, the capturing camera, when recognizing a person who is in the space Sp by image processing or the like, estimates that a position of the person who is in the space Sp is the position (the coordinates Cd4) of the user U. In such a case, the capturing camera obtains the coordinates Cd4 of the position of the user U by using the position of the capturing camera as an origin. Similarly, the capturing camera obtains coordinates Cd5 of the speaker 2 by using the position of the capturing camera as an origin. It is to be noted that the capturing camera, as shown in FIG. 10, may estimate the position of the MR goggles 1 to be the position (the coordinates Cd4) of the user U, in a case of recognizing the MR goggles 1 by image processing. Similarly, the capturing camera obtains the position information (the first position information in the present disclosure) FLI that shows the position of the ceiling surface CS, the wall surface WS, or the floor surface FS, and the position information (the second position information in the present disclosure) SLI that shows the position of the speaker 2.

The MR goggles 1 obtain the direction information DI from the speaker 2. The MR goggles 1 calculate the locus of the sound beam B1, based on the position information FLI, the position information SLI, and the direction information DI. The position information FLI, the position information SLI, the direction information DI, and the position (the coordinates Cd4) of the user U is a position with reference to the position of the capturing camera. Therefore, the MR goggles 1 convert the position information FLI, the position information SLI, and the direction information DI into a position at which the coordinates Cd4 are defined as a reference (an origin), and convert the locus of the sound beam. The MR goggles 1 perform display on the basis of a sound beam image. The MR goggles 1 display the sound beam image with reference to the position of the user U. Therefore, the user U can visually recognize the direction of the sound beam B1 to be outputted from the speaker 2.

Fourth Modification

Hereinafter, in the fourth modification, a first apparatus (a server or the like) different from the MR goggles 1 performs all calculations and generation of a sound beam image. The MR goggles 1 (a second apparatus) of the fourth modification obtain a sound beam image generated by the server (the first apparatus) or the like, and display an obtained sound beam image on the display 14.

Advantageous Effect

In the present modification, a different apparatus such as a server, in place of the MR goggles 1, performs the first image processing, the second image processing, the calculation of the locus of the sound beam B1, and the generation of the sound beam image. Therefore, a load of processing on the MR goggles 1 is reduced. Therefore, even when performance of the processor 13 of the MR goggles 1 is low, the MR goggles 1 are able to more easily display the sound beam image, without causing a delay or the like.

The description of the foregoing embodiments and modifications is illustrative in all points and should not be construed to limit the present disclosure. The scope of the present disclosure is defined not by the foregoing embodiments and modifications but by the following claims. Further, the scope of the present disclosure is intended to include all changes within the scopes of the claims of patent and within the meanings and scopes of equivalents.

The configurations of the MR goggles 1, the MR goggles 1*a*, the VR goggles according to the second modification, the MR goggles 1 according to the third modification, and the MR goggles 1 according to the fourth modification may be optionally combined.

What is claimed is:

1. An information processing method comprising:
- obtaining first position information that indicates a position of at least one of a ceiling surface, a wall surface, or a floor surface in a predetermined space;
- obtaining second position information that indicates a position of an acoustic device that outputs a sound beam in the predetermined space;
- obtaining direction information that indicates a direction of the sound beam to be outputted from the acoustic device;
- calculating a locus of the sound beam to be outputted from the acoustic device, based on the first position information, the second position information, and the direction information that have been obtained;
- generating a sound beam image that shows the locus of the sound beam, based on a result of the calculating;
- obtaining characteristic information that indicates a degree of sound absorption of the at least one of the ceiling surface, the wall surface, or the floor surface; and
- varying a visual display of a reflection image showing a reflection of the sound beam reflecting off of at least one of the ceiling surface, the wall surface, or the floor surface, based on the degree of the sound absorption.

2. The information processing method according to claim 1, further comprising:
- calculating, based on the first position information, the second position information, and the direction information:
  - a position of the reflection of the sound beam on the at least one of the ceiling surface, the wall surface, or the floor surface, and
  - a locus of the sound beam after the reflection, wherein the sound beam image includes the reflection image that shows the locus of the sound beam after the reflection.

3. The information processing method according to claim 1, further comprising:
- obtaining first image data by capturing the at least one of the ceiling surface, the wall surface, or the floor surface; and
- performing first image processing to recognize the at least one of the ceiling surface, the wall surface, or the floor surface from the first image data, wherein the first position information is obtained based on a result of the first image processing.

4. The information processing method according to claim 1, further comprising:
- obtaining second image data by capturing the acoustic device; and
- performing second image processing to recognize the acoustic device from the second image data, wherein the second position information is obtained based on a result of the second image processing.

5. The information processing method according to claim 1, further comprising:
- obtaining camera image data by capturing by a camera;
- generating a display image from the camera image data;
- performing processing to superimpose the sound beam image on the display image; and
- outputting the display image on which the sound beam image is superimposed.

6. The information processing method according to claim 1, further comprising:
- obtaining user position information that indicates a user position, wherein the locus of the sound beam to be outputted from the acoustic device is calculated based on the first position information, the second position information, the direction information, and the user position information that have been obtained.

7. The information processing method according to claim 1, wherein the sound beam image is varied based on at least one of a channel of the sound beam, a volume of the sound beam, or frequency characteristics of the sound beam.

8. The information processing method according to claim 1, wherein:
- obtaining the first position information, obtaining the second position information, obtaining the direction information, calculating the locus of the sound beam, and generating the sound beam image are performed by a first apparatus;
- the method further comprising:
  - obtaining, by a second apparatus, the sound beam image generated by the first apparatus; and
  - displaying, by the second apparatus, the sound beam image on a display.

9. An information processing apparatus comprising:
- at least one processor configured to:
  - obtain first position information that indicates a position of at least one of a ceiling surface, a wall surface, or a floor surface in a predetermined space;
  - obtain second position information that indicates a position of an acoustic device that outputs a sound beam in the predetermined space;
  - obtain direction information that indicates a direction of the sound beam to be outputted from the acoustic device;
  - calculate a locus of the sound beam to be outputted from the acoustic device, based on the first position information, the second position information, and the direction information that have been obtained;
  - generate a sound beam image that shows the locus of the sound beam, based on a result of calculation;

obtain characteristic information that indicates a degree of sound absorption of the at least one of the ceiling surface, the wall surface, or the floor surface; and vary a visual display of a reflection image showing a reflection of the sound beam reflecting off of at least one of the ceiling surface, the wall surface, or the floor surface, based on the degree of the sound absorption.

10. The information processing apparatus according to claim 9, wherein the at least one processor is further configured to:

calculate, based on the first position information, the second position information, and the direction information:

a position of the reflection of the sound beam on the at least one of the ceiling surface, the wall surface, or the floor surface, and a locus of the sound beam after the reflection; and wherein the sound beam image includes the reflection image that shows the locus of the sound beam after the reflection.

11. The information processing apparatus according to claim 9, wherein the at least one processor is further configured to:

obtain first image data by capturing the at least one of the ceiling surface, the wall surface, or the floor surface;

perform first image processing to recognize the at least one of the ceiling surface, the wall surface, or the floor surface from the first image data; and obtain the first position information, based on a result of the first image processing.

12. The information processing apparatus according to claim 9, wherein the at least one processor is further configured to:

obtain second image data by capturing the acoustic device;

perform second image processing to recognize the acoustic device from the second image data; and obtain the second position information, based on a result of the second image processing.

13. The information processing apparatus according to claim 9, wherein the at least one processor is further configured to:

obtain camera image data by capturing by a camera;

generate a display image from the camera image data;

perform processing to superimpose the sound beam image on the display image; and output the display image on which the sound beam image is superimposed.

14. The information processing apparatus according to claim 9, wherein the at least one processor is further configured to:

obtain user position information that indicates a user position; and calculate the locus of the sound beam to be outputted from the acoustic device, based on the first position information, the second position information, the direction information, and the user position information that have been obtained.

15. The information processing apparatus according to claim 9, wherein the at least one processor is further configured to:

vary the sound beam image, based on at least one of a channel of the sound beam, a volume of the sound beam, or frequency characteristics of the sound beam.

16. The information processing apparatus according to claim 9, wherein:

a first processor of the at least one processor is configured to obtain the first position information, obtain the second position information, obtain the direction information, calculate the locus of the sound beam, and generate the sound beam image; and a second processor of the at least one processor is configured to:

obtain the sound beam image generated by the first processor that is different from the second processor; and display an obtained sound beam image on a display.

17. An information processing method comprising:

obtaining first position information that indicates a position of at least one of a ceiling surface, a wall surface, or a floor surface in a predetermined real space;

obtaining second position information that indicates a position of an acoustic device that outputs a sound beam in the predetermined real space;

obtaining direction information that indicates a direction in a three-dimensional rectangular coordinate system of the sound beam to be outputted from the acoustic device;

calculating a locus of the sound beam to be outputted from the acoustic device and a locus of a reflected sound beam reflected off of the at least one of the ceiling surface, the wall surface, or the floor surface, based on the first position information, the second position information, and the direction information that have been obtained, wherein the calculating matches the three-dimensional rectangular coordinate system with a position of two-dimensional coordinates of a display; and superimposing an image of a sound beam image that shows the locus of the sound beam and the locus of the reflected sound beam onto the predetermined real space by generating a sound beam image on the display, based on a result of the calculating.

18. The information processing method according to claim 17, comprising:

varying a visual display of the reflected sound beam based at least on a degree of sound absorption of the at least one of the ceiling surface, the wall surface, or the floor surface.

19. The information processing method according to claim 17, wherein:

the three-dimensional rectangular coordinate system is a three-dimensional rectangular coordinate system of the real space visible from the display.

20. The information processing method according to claim 17, comprising:

superimposing the image of the sound beam image on the display onto the real space visible through the display.

* * * * *